Patented May 13, 1952

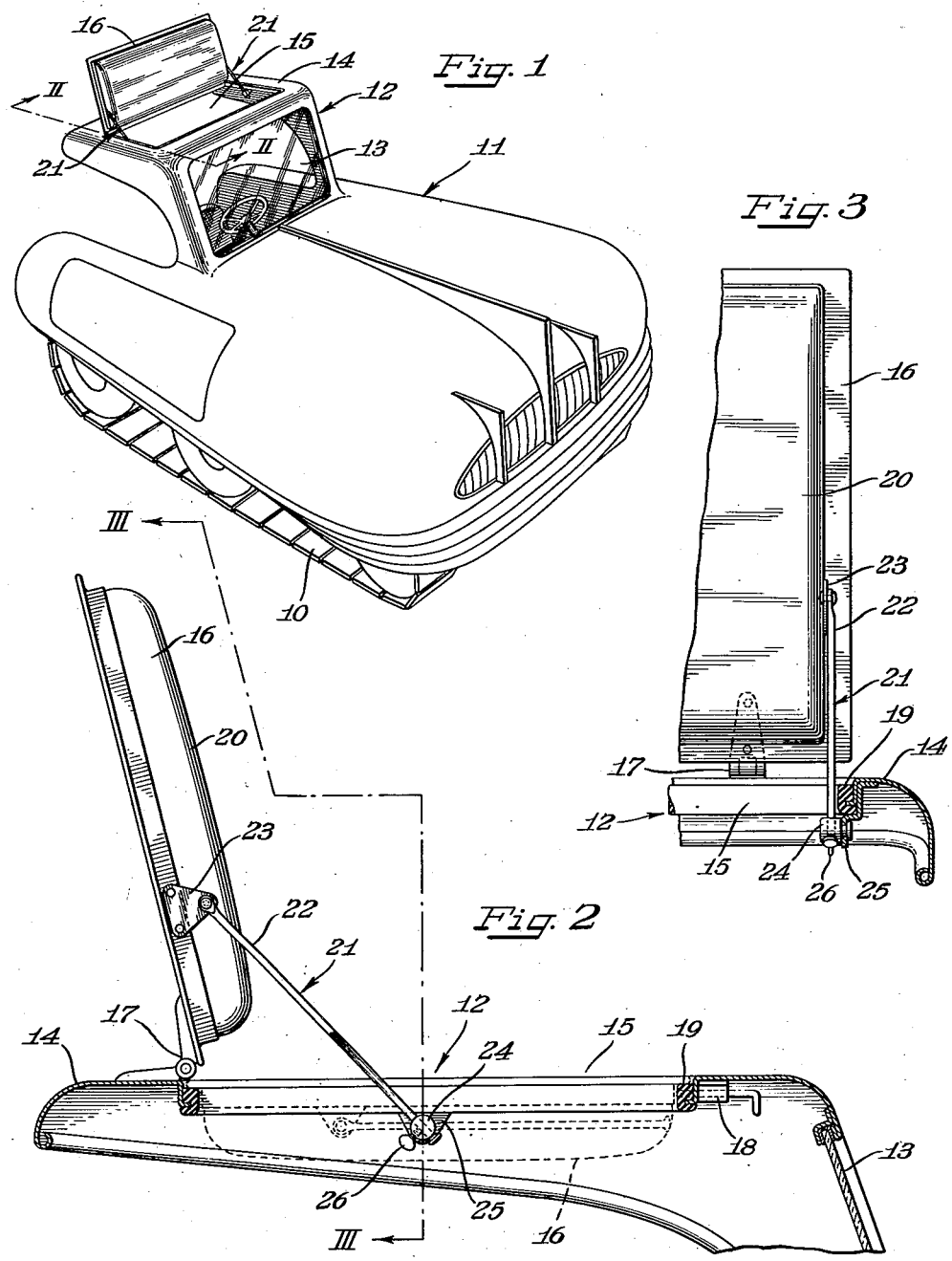

2,596,903

UNITED STATES PATENT OFFICE 2,596,903

SAFETY TRACTOR CAB

Roy A. Kropp, River Forest, Ill., assignor to Kropp Forge Company, Cicero, Ill., a corporation of Illinois Application February 13, 1948, Serial No. 8,059

5 Claims. (Cl. 296—28)

This invention relates to a safety structure for vehicles, and more particularly to a safety tractor cab.

The subject matter of this application has been in part carved from my copending application, Serial No. 592,424 filed May 7, 1945, now abandoned, and hence this application is a continuation-in-part of my parent case.

At the present time in the operation of vehicles such as tractors, it is desirable at times for the operator to stand up either for the purpose of relieving fatigue or for obtaining a greater range of visibility. Now unless some safe guards are taken to protect him while in an erect position, a sudden lurch of the vehicle might easily throw him below the wheels or tractor treads thereof.

It is accordingly an object of this invention to provide a safety device for a vehicle such as a tractor which will assist in precluding the operator from being suddenly jarred from the vehicle by the lurching of the vehicle when the operator is in an upright or standing position.

Another object of this invention is to provide a cab for a vehicle body which serves the dual purpose of acting as a cover for the operator's station, and also of providing a safety rail when the operator is in a standing position.

Yet another object of this invention is to provide a closure for an opening in a vehicle cab which will serve the dual purpose of closing an opening in the top of the cab and of also serving as a backrest for the operator when in open position.

In accordance with the general features of this invention there is provided in the vehicle, including a body having an operator's station and a top covering such station, an opening in the top over the station and through which the operator can move upwardly into a standing position with the portion of the top about the opening serving as a safety rail about the body of the operator.

Another feature of the invention relates to the provision of a lid for the aforesaid opening hinged to the body top so as to be swingable backwardly into a generally upright position whereby it can serve as a backrest for the operator.

Other features relate to the manner in which the top is hinged to the vehicle, as well as to the provision of a seal therewith about the edge of the opening which, in addition to serving as a seal, also performs the function of a safety cushioning about the edge of the opening.

Other objects and advantages of the present invention will be readily apparent from the description of the single embodiment of the invention illustrated in the accompanying drawings, in which:

Figure 1 is an isometric view of a tractor having a cab embodying the features of this invention;

Figure 2 is a fragmentary sectional view taken on substantially the line II—II of Figure 1 looking in the direction indicated by the arrows, showing in full lines the upright position of the hinged hood and by dotted lines the closed position of the same; and Figure 3 is a fragmentary vertical view partly in section taken on substantially the line III—III of Figure 2 looking in the direction indicated by the arrows.

As shown on the drawings:

The reference character 10 designates generally a vehicle which may take the form of a tractor, and in this case is illustrated as having a streamlined body 11.

Projecting upwardly from the body 11 at the driver's station is a cab designated generally by the reference character 12, and which includes a windshield 13 through which the operator looks when operating the vehicle and a top 14 for normally covering and protecting the driver's station from the direct effect of the natural elements. By preference, the top 14 is of canopy type, projecting rearwardly from the upper portion of the front of the cab 12 above the windshield 13, and with the sides and the rear of the cab open. As will be apparent from Figure 1, the driver's seat and the steering wheel of the tractor shown are substantially centered in the cab 12 and the driver gains access to the cab through the open rear side thereof.

The cab top 14 has a generally rectangular opening 15 directly over the driver's station and centered above the position occupied by the driver of the tractor when in driving position behind the steering wheel. The opening 15 is of a size to permit of the operator or driver standing upright therethrough while continuing to operate the steering wheel and other operating controls of the tractor located within the cab 12. It will be observed in Fig. 1 that the opening 15 occupies the major area of the top 14 and extends almost entirely across the top so that the standing driver will have complete freedom to move his arms. This opening is adapted to be closed by a cover or lid 16 attached by any suitable pivotable means such as the hinges 17 to the top 14 of the cab. These hinges are located at the rear edge of the opening 15 and are arranged so that when the lid is in closed position its upper side will be substantially flush with the top surface of the cab top 14. Any suitable means, such as a conventional manual latch 18 may be employed for locking the lid in its closed position. The latch or locking device 18, irrespective of what conventional form it may take should preferably be located inside of the cab 12 in a position readily accessible to the operator at the driving or steering station. In addition, the edge of the opening 15 may be provided with a resilient or rubber ring for sealing engagement with the edge of the lid when the lid is in closed position. This ring 19 serves the dual function of sealing the cab against the entry of moisture through the opening 15 when the lid is closed; and when the lid is open serves as a cushioning guard or safety rail about the body of the operator when he is in standing position.

Now in addition I find it desirable to utilize the lid 16 when in open position as a backrest for the operator should he have to stand for any length of time in a position where he projects through the opening 15 in the top of the cab of the vehicle. To this end I provide the normally undersurface of the lid with a cushion or an upholstered pad 20 and also with extension devices 21 for holding the lid in a generally upright or inclined position.

The extension devices 21 may be of any suitable or conventional construction. I have illustrated the lid as being provided with two of them, one on each side, although it is possible that one, if made strong enough, would suffice. They are, however, identical with the exception that one is on the right hand side and one is on the left hand side of the lid.

Each of the extension devices 21 includes an extension arm 22 pivoted at one end to bracket 23 fastened to the lid 16 and at its other end is slidably disposed in a pivotally mounted stud 24 carried by a bracket 25 fastened to the underside of the top 14 adjacent to the side edge of the opening 15. The pivotal stud 24 carries an adjusting or set screw 26 by means of which the rod 22 may be secured in an adjusted position, as, for example, as shown in Figure 2 and in which position the lid is held in rearwardly inclined condition above the top of the cab.

When it is desired to lower the lid, the set screw 26 is loosened and the rod 22 is slid downwardly through the stud 24 to the dotted position shown in Figure 2, or until the cover 16 is in its closed position.

From the foregoing it is clear that the resilient edge of the top 14 about the opening 15 serves as a safety guard rail for the operator when he is in standing position. Moreover, the lid or closure 16 when moved out of the opening can be adjustably fastened in an upright inclined position so as to serve as a backrest. On the other hand, when the lid is moved to its lowermost position the edge of the opening serves as a seal about the closure or lid 16.

Thus I have provided a very simple means of safe guarding a person operating the tractor, while standing up in the cab, against injury by reason of a sudden lurch of the vehicle, and against his being thrown under the wheels or treads of the vehicle.

I claim as my invention:

1. In combination in a tractor including a body having a driver's station, a cab at said driver's station including a front wall having a windshield and a top projecting rearwardly from the front wall above the windshield, a driver's seat and a steering wheel below said top and rearwardly from said windshield, said top having an opening occupying the major portion of the top area and extending from side to side throughout almost the entire top width, said opening being centered above the driver's seat and the steering wheel and being of ample size to permit a driver of the tractor standing up and with the upper portion of the body projecting through the opening with complete freedom for use of his arms in manipulating the steering wheel, and a lid for closing said opening hinged at the rear of the opening and including means for supporting the lid in an upwardly and rearwardly slanting position at the rear of the opening to serve as a back rest for the standing driver.

2. In combination in a tractor including a body having a driver's station, a cab at said driver's station including a front wall having a windshield and a top projecting rearwardly from the front wall above the windshield, a driver's seat and a steering wheel below said top and rearwardly from said windshield, said top having an opening occupying a large portion of the top area and extending from side to side throughout almost the entire top width, said opening being centered above the driver's seat and the steering wheel and being of ample size to permit a driver of the tractor standing up and with the upper portion of the body projecting through the opening with complete freedom for use of his arms in manipulating the steering wheel, and a lid for closing said opening hinged at the rear of the opening and including means for supporting the lid in an upwardly and rearwardly slanting position at the rear of the opening to serve as a back rest for the standing driver, said lid having padding on its normally under surface and when upstanding its forward surface projecting forwardly beyond the rear edge defining said opening.

3. In combination in a tractor including a body having a driver's station, a cab at said driver's station including a front wall having a windshield and a top projecting rearwardly from the front wall above the windshield, a driver's seat and a steering wheel below said top and rearwardly from said windshield, said top having an opening occupying the major portion of the top area and extending from side to side throughout almost the entire top width, said opening being centered above the driver's seat and the steering wheel and being of ample size to permit a driver of the tractor standing up and with the upper portion of the body projecting through the opening with complete freedom for use of his arms in manipulating the steering wheel, and a lid for closing said opening hinged at the rear of the opening and including means for supporting the lid in an upwardly and rearwardly slanting position at the rear of the opening to serve as a back rest for the standing driver, said opening being defined by a depending flange and said flange having a cushioning guard thereon serving as a safety rail.

4. In combination in a safety tractor cab, a front wall having a windshield, a top wall projecting rearwardly from the upper portion of the front wall and having an opening therein occupying substantial area of the top wall, said opening being located to be in position above a driver's seat and steering wheel for the tractor to afford clearance for the upper portion of the driver's body if he wishes to stand up in the cab, a cover hinged at the rear of the opening and in closed position lying flush with the upper surface of said top wall, said top wall having about said opening a sealing and cushioning ring inset relative to the upper surface of the top wall to receive the cover sealingly thereon when closed and serving as a safety rail when the cover is open.

5. In combination in a tractor including a body, a driver's cab carried by said body and having therein a driver's seat and a steering wheel for steering the tractor, said cab having a front wall including a windshield forwardly from the steering wheel, a canopy top projecting rearwardly from the upper portion of said front wall and at a height above the driver's seat such that when the driver stands up the upper portion of his body will be at a higher elevation than said top, said top having an opening therein centered above the driver's seat and steering wheel and dimensioned to freely accommodate the upper portion of the standing driver's body with the width of the opening such as to permit complete freedom of movement of the driver's arms in manipulating the steering wheel, and a cover hinged at the rear of said opening and including means for supporting the cover in generally upstanding position at the rear of the opening to serve as a back rest for the standing driver.

ROY A. KROPP.

REFERENCES CITED

The following references are of record in the file of this patent:

UNITED STATES PATENTS

| Number | Name | Date |
| --- | --- | --- |
| 1,640,873 | Balzer et al. | Aug. 30, 1927 |
| 1,856,773 | Masury | May 3, 1932 |
| 1,919,387 | Stringer | July 25, 1933 |
| 1,928,306 | Brennan | Sept. 26, 1933 |
| 2,192,207 | Stahl | Mar. 5, 1940 |
| 2,370,508 | Wilkie | Feb. 27, 1945 |
| 2,408,955 | Reynolds, Jr. | Oct. 8, 1946 |
| 2,532,948 | Sanden | Dec. 5, 1950 |

OTHER REFERENCES

Motorboat "Sou'Wester," by Winslow, an article in "Motorboat" magazine, Jan. 1947, page 57.